(12) United States Patent
Barnum (10) Patent No.: US 11,779,142 B2
(45) Date of Patent: Oct. 10, 2023

(54) CONFIGURABLE FOOD TRAYS AND MODULAR CONTAINERS

(71) Applicant: Micha Barnum, Pelham, NH (US)

(72) Inventor: Micha Barnum, Pelham, NH (US)

( * ) Notice: Subject to any disclaimer, the term of this patent is extended or adjusted under 35 U.S.C. 154(b) by 288 days.

(21) Appl. No.: 16/186,574

(22) Filed: Nov. 11, 2018

(65) Prior Publication Data

US 2019/0142196 A1    May 16, 2019

(51) Int. Cl.

| A47G 19/02 | (2006.01) |
| A47G 19/06 | (2006.01) |
| A47G 23/06 | (2006.01) |
| B65D 1/26 | (2006.01) |
| B65D 1/36 | (2006.01) |
| B65D 21/04 | (2006.01) |
| B65D 71/70 | (2006.01) |
| A47G 19/22 | (2006.01) |

(52) U.S. Cl.
CPC ....... *A47G 23/0641* (2013.01); *A47G 19/025* (2013.01); *A47G 19/06* (2013.01); *A47G 19/2227* (2013.01); *A47G 23/06* (2013.01); *B65D 1/265* (2013.01); *B65D 1/36* (2013.01); *B65D 21/048* (2013.01); *B65D 71/70* (2013.01)

(58) Field of Classification Search
CPC .. A47G 19/025; A47G 19/06; A47G 19/2227; A47G 23/06; A47G 23/0641; B65D 1/265; B65D 1/36; B65D 21/048; B65D 71/70

USPC ....... 211/126.11, 126.2, 126.3, 126.4, 126.7; 220/23.83, 23.86, 23.87, 23.88, 23.89, 220/507, 553, 555, 556
See application file for complete search history.

(56) References Cited

U.S. PATENT DOCUMENTS

| 1,972,519 | A | * | 9/1934 | Hasenour | A61J 7/0069 |
| | | | | | 294/159 |
| 2,047,582 | A | * | 7/1936 | Hale | A47G 19/02 |
| | | | | | 220/574 |
| 2,988,258 | A | * | 6/1961 | Witzke | B65D 43/0222 |
| | | | | | 229/400 |
| 3,002,646 | A | * | 10/1961 | Lewis | B65D 1/265 |
| | | | | | 220/62.11 |
| 3,122,265 | A | * | 2/1964 | Innis | A47G 23/06 |
| | | | | | 206/502 |
| 3,300,055 | A | * | 1/1967 | Rohr | A61B 50/22 |
| | | | | | 211/74 |
| 3,385,465 | A | * | 5/1968 | Bliss | A47J 27/122 |
| | | | | | 220/23.4 |
| 3,526,334 | A | * | 9/1970 | Swett | A47J 47/02 |
| | | | | | 220/23.83 |

(Continued)

*Primary Examiner* — Joshua E Rodden (57) ABSTRACT

A disposable or reusable food base tray and plurality of container modules is disclosed which allows the user to both hold food directly in compartments on the base tray and configure a plurality of similar or different food and beverage container modules selected by the user to securely fit the compartments on the surface of the base tray. Container modules include but are not limited to bowls, partitioned modules, cups, cup adapters, platters and other container modules. An additional feature includes the ability to stack an additional tray securely on top of said container modules. An additional feature includes unique themed identifiers on base trays and container modules so that users can readily identify and remember which items belong to the user.

10 Claims, 6 Drawing Sheets

(56) References Cited

U.S. PATENT DOCUMENTS

| | | | | | |
|---|---|---|---|---|---|
| 3,908,877 | A | * | 9/1975 | Kosisky | A47G 23/0641 294/143 |
| 4,279,354 | A | * | 7/1981 | Conti | A47G 19/02 206/501 |
| 4,593,819 | A | * | 6/1986 | Will | A61J 1/03 206/501 |
| 4,749,085 | A | * | 6/1988 | Denney | B65D 25/103 206/459.5 |
| 5,022,183 | A | * | 6/1991 | Bohlmann | A01G 9/045 206/423 |
| 5,224,594 | A | * | 7/1993 | Hou | B43M 99/001 206/214 |
| 5,344,024 | A | * | 9/1994 | Cohu | A45C 5/03 206/526 |
| 5,366,069 | A | * | 11/1994 | Seidner | A45C 1/10 206/0.84 |
| 5,386,922 | A | * | 2/1995 | Jordan | A01K 97/06 206/373 |
| 5,669,498 | A | * | 9/1997 | Fierek | B25H 3/06 206/373 |
| 6,041,932 | A | * | 3/2000 | Holmberg | A61J 7/0069 206/459.5 |
| 9,179,756 | B2 | * | 11/2015 | Weinberg | A45C 11/008 |
| 10,143,627 | B2 | * | 12/2018 | Miceli | A61J 7/0069 |
| 10,383,793 | B2 | * | 8/2019 | Knobel | B65D 50/066 |
| 10,772,447 | B2 | * | 9/2020 | Roaks | A47G 23/0303 |
| 10,906,712 | B2 | * | 2/2021 | Knobel | B65D 25/10 |
| 2004/0232147 | A1 | * | 11/2004 | Smith | B65D 1/24 220/23.87 |
| 2007/0284358 | A1 | * | 12/2007 | Claffy | B29C 44/0407 219/386 |
| 2008/0138477 | A1 | * | 6/2008 | Mular | A47J 47/10 426/392 |
| 2018/0047309 | A1 | * | 2/2018 | Hupp, Sr. | G09F 3/0289 |

\* cited by examiner

CONFIGURABLE FOOD TRAYS AND MODULAR CONTAINERS

BACKGROUND

Field of the Invention

The present invention relates to food plates and trays and particularly to compartmented food serving plates and trays and specifically to disposable and reusable food serving plates and trays with compartments and configurable container modules.

Description of the Related Art

There are many situations where people need a plate and/or tray to carry various quantities of different foods from a place where food is served to a place where the food is consumed, and where the plate or tray serves as a way to keep the food organized and separated during serving of the food, carrying of the food, and consumption of the food. Some examples of such situations include as an example—but are not limited to—potluck dinners, barbeques, fundraising meals, chili or soup cook-offs or contests, restaurants, buffets, cafes, picnics, family meals, informal meals, special event meals such as birthdays, holidays, weddings, anniversaries, graduations, religious holidays, camping trips, seminars, retreats and other events and situations.

Compartmentalized plates or trays are typically preferred when a user will consume more than one type of food in one sitting because the plates make it easier for a user to add different kinds of foods to the plate or tray while keeping the foods and their flavors separated. Often such situations include cups for beverages and a typical user of the plates or trays may also have one or more cups plus one or more dishes and/or bowls of food that the user needs to carry to a seating area for consumption. Trays are often used so that users can carry more plates, cups, bowls and other containers in a single trip while reducing risk of spills when a user is carrying more than two containers with two hands.

Disposable plates, trays and containers including bowls and cups are often desirable due to the low cost of purchase of such items, the ease and speed of clean-up after use or after an event, the ease of adjusting the supply to variations in numbers of users and numbers of plates and other containers used by each user, and the lack of a need to wash and store the plates, trays and containers after an event.

Disposable compartmented plates and trays for the food industry are known. There is disclosed in U.S. Pat. No. 1,848,066 issued to Shepard et al on Mar. 1, 1932 a disposable paper plate with three fixed compartments. There is disclosed in U.S. Pat. No. 6,401,962 issued to Littlejohn et al on Jun. 11, 2002 a disposable food serving bowl. There is disclosed in U.S. Pat. No. 3,792,809 issued to Schneider et al on Feb. 19, 1974 a light weight serving tray suited for disposable use. There is disclosed in U.S. Pat. No. D461,406 issued to Iacovelli on Aug. 13, 2002 a disposable food tray. There is disclosed in U.S. Pat. No. 3,501,044 issued to Stone on Mar. 17, 1970 a disposable food tray with removable inserts of a fixed size that align with the fixed shape of the tray. There is disclosed in U.S. Pat. No. 4,823,959 issued to Bixler on Apr. 25, 1989 and U.S. Pat. No. 3,103,303 issued to Lynchey on Sep. 10, 1963 disposable beverage holder trays. There is disclosed in U.S. Pat. No. 7,484,344 issued to Schlitz et al on Feb. 3, 2009 compartment plates whereby the compartments contribute to a visual theme. There is disclosed in U.S. Pat. No. 4,966,296A an integrated food tray with individual separable food containers for heating and cooling food. There is disclosed in U.S. patent application US20170020314A1 an educational eating plate with question on one side and answer on the other side.

However, the type of disposable or reusable tray or plate that is best suited for a given situation differs by the type of event, the types and quantities of food and beverages available, the preferences of the host, and by the preferences of each user of the tray or plate. For example, a soup cook-off or contest might require multiple sample-size bowl-type compartment configurations while a barbeque might require fewer, larger, low wall compartments. Each user of the tray or plate at a potluck or buffet may have different preferences for the configuration of the plate or tray they use based on the foods they desire to consume. Some users desire only a few larger items and consequently desire a tray or plate with a few large compartments for foods like chicken legs, salads, ribs, pasta dishes, or similar foods while other users desire many smaller, non-solid foods such as soups, stews and chilis and consequently desire a tray or plate with many small compartments with higher compartment divider walls to hold more food more compactly and to keep the food items from mixing.

The related art does not solve the problem of letting hosts or users of the disposable or reusable tray or plate adapt the food tray or plate to their different needs and preferences. The related art describes trays or plates with compartments of a fixed size that are not able to be easily reconfigured with modular components that allow said compartments to be sub-divided, combined, or altered with higher walls. Therefore the related art does not solve the need of users to hold a greater variety of foods while keeping the foods separate; nor does it allow users to hold larger quantities of non-solid foods such as soups or a plurality of larger quantities of non-solid foods; nor does it allow users to adapt the configuration of the containers to their individual preferences.

The related art also does not provide an easy way for users to reconfigure a disposable or reusable tray to allow the user to securely carry various quantities of non-solid foods and beverages together with other foods and/or sauces, while keeping each item separate, yet facilitating portability by keeping all items secure on a single, easy-to-carry disposable or reusable tray. Because the related art does not solve the need of users to securely carry all of their food and beverage items on a single tray the related art leaves users with either making multiple trips to carry more plates, bowls and cups than they can carry with two hands; having to use a tray if one is available which in many situations a tray is not provided; or attempt to carry multiple dishes, bowls and cups and incur a higher potential for accidental spills causing potential embarrassment; injury to themselves and others from being burned by hot food or beverage items or slipping on the spilled food or beverage; damage to clothes, personal items, carpeting, upholstery, and other property; and potentially expensive legal claims against a host of an event or owner of a facility.

The related art does not provide a way for users to safely carry a larger number and variety of food and beverage compartments safely and securely to reduce risks of spillage and potential injury from hot liquids that are spilled. A typical meal could involve multiple servings of soup, beverages, and other types of food. The related art does not hold a significant variety of different types of containers in a secure way that would resist spilling if the user tilts the tray excessively or is bumped by another person. The related art also does not provide a way to hold as wide a variety of standard size cups securely in combination with holding food containers.

Users who need to also get food for other people, such as parents getting food for small children or caretakers getting food for elderly or disabled people in their care, experience even greater difficulty in getting the food and beverages for each person without having to make multiple trips which would interrupt their supervision of, and their visual attention to, such people. The prior art does not provide an easy way for these users to carry multiple beverages and food items for more than one person securely in a single trip or to easily stack trays and food containers to carry enough food for multiple people in an organized, secure way.

The prior art does not provide a way for users to keep a wide variety of foods separated in a compact personal space on a table. Instead users may get multiple full sized plates with fixed dividers providing only a few compartments, bowls and/or cups to keep food separate, which then take up an larger amount of table space than is optimal potentially causing insufficient table space for all users sitting together, food to be more difficult to access, discomfort for users trying to access all of the food, more spills and accidents accessing the food, and potential embarrassment if one person's food causes another person to have difficulty finding a space to put all of his or her food on the table. For example, if a user would like to try small amounts of 10 different types of soup or chili and keep each type of food separated, the user would need 4 plates having three compartments each; or 3 plates having four compartments each; or 10 bowls; or some combination of compartmented plates and bowls. Any such combination would require more table space than is necessary or practical.

The related art also does not provide a way for a host to easily encourage consumers to take smaller portions of non-solid foods so that such foods are not wasted, or so that foods that are more expensive, more desirable, or in limited quantity are not consumed too quickly by those who are in the front of the line, as might occur when typically sized bowls are provided for such foods. Participants are more likely to match portion sizes to the size of the compartments that are available so if they are given standard size bowls they are more likely to fill the bowl, even if they do not intend to consume the full amount. If hosts are able to give participants trays or plates with smaller compartment sizes, or place smaller sized modules next to foods that the host desires to be consumed in smaller quantities, it is more likely that participants will choose smaller portion sizes.

The related art also does not provide an easy way for users to select a wider variety of smaller portions since typical disposable bowls—such as common ten ounce, twelve ounce, or twenty ounce sizes—are designed to accommodate a sizeable portion. Users of typical bowls would have difficulty carrying multiple bowls for each non-solid food such as soups, and might feel embarrassed by only putting a small portion in each large bowl since it could feel wasteful of a disposable bowl for such a small portion. In some cultures, guests that only add a small portion to a typically-sized bowl could appear to dislike the food which could be considered insulting to the host or to the person who made the food. Persons with dietary restrictions and limitations could feel especially uncomfortable in such a setting and potentially feel social pressure to consume an amount of food that for them would be unhealthy.

The related art does not readily accommodate the special needs of left handed people, disabled people or small children, all of whom would be better suited by a food tray with component modules that can be reconfigured to their special needs. Such needs might include relocating higher wall food containers to be more accessible while keeping all food compartments close together so that they are more accessible while also keeping all food containers secure on a tray and preventing potentially embarrassing, damaging, and/or dangerous spills.

The related art also fails to minimize the impacts of disposable items on the environment and the economic cost of the disposable items to hosts. Typical bowl sizes might require a user to use many bowls in order to sample multiple items in a single trip or to use more bowls to avoid residual flavors from a prior use, which then leads to the greater waste of those larger bowls. Likewise, users of disposable compartmented plates who do not want to allow food flavors to be altered by other foods or who wish to try a large variety of available foods in a single trip to a serving area would be inclined to use a plurality of compartmented plates which are then typically thrown in the trash. The standard size bowls and compartmented plates produced based on the prior art use a much higher ratio of material to food quantity than is needed for small portion sizes. The excess material used increases economic costs for hosts and increases harmful impacts on the environment when the materials are disposed of in a landfill or incinerator, or require more energy in a recycling process. The environmental impacts are substantial when such excess materials add up across many uses by millions or hundreds of millions of people multiple times per year.

The related art also does not provide an immediate way for users to determine if a disposable or reusable tray, plate, cup, bowl or other utensil is one that he or she selected for personal use or if the item was selected and potentially used by another person, thereby risking embarrassment, potential exposure to another person's germs and consequently potential adverse health impacts. Often, if a user is unsure whether a disposable item is the one that he or she is using, the item and food contained in the item will be thrown away and the participant may get another disposable item and more food causing food waste, higher materials costs for the host, and increased adverse environmental impact.

SUMMARY

Briefly, the present invention provides a food tray and a plurality of container modules which can be disposable or reusable in any combination and that can be adapted to different users' needs and preferences by adding one or more container modules securely to the base tray. The base tray and container modules provide various compartment size options to contain various different amounts and types of foods and beverages. The present invention also includes an ability to stack trays using container modules and a unique identifier so that a user can easily know which containers are being used by the user.

Objects and Advantages

Several objects and advantages of the present invention are:

It is an object of the invention to provide a disposable or reusable food tray and a plurality of container modules that can be configured according to the special needs of an event. For example, a chili cook-off might require many small sampler bowls rather than current typical methods like using plates with few shallow compartments or using multiple typical size bowls.

It is a further object of the invention to provide a disposable or reusable food tray and a plurality of container modules that can be configured according to the special preferences of the host. As examples, the host may want to encourage smaller portion sizes to reduce costs or avoid running out of a favorite food item, or to merely provide samples of many different food items. Thus the host for example may provide the base tray alone which has many small compartments or may provide the base tray accompanied by sample size multi-compartment container modules to influence the portion size that users obtain.

It is a still further object of the invention to provide a disposable or reusable food tray and a plurality of container modules that can be configured to the special preferences of a user. As examples, a user would be able to choose from various container modules such as one or more cups, one or more larger bowls or low-sided bowls, one or more multi-section bowls, platters, sauce containers and various other food and beverage container modules in various combinations.

It is a still further object of the invention to provide a way for users to keep a greater number of different kinds of foods separated than the number that is supported by the prior art, and to prevent unintentional mixing of the flavors of different foods which could alter the food flavors. The invention keeps a greater variety of foods separated which also avoids the unsightly and potentially embarrassing appearance of different foods piled together or the embarrassment and waste of using multiple bowls, plates, cups or other containers to keep the plurality of different foods separated.

It is a still further object of the invention to simplify transporting of food by allowing a greater number of different types of foods and beverages to be carried securely on a single tray or on multiple stackable trays, rather than requiring a user to make multiple trips or to try to carry an awkward number of containers. As an example, a user could easily carry a beverage, four types of soup and several food items with the invention's tray and container modules, but would have difficulty using conventional containers to carry a beverage, four bowls of soup, and a compartmented plate unless the host also provided a tray, which then still would not hold the containers securely.

It is a still further object of the invention to provide a safer way to carry a plurality of different combinations of beverages, soup servings and other food items in a single trip in a way that reduces the likelihood of accidental spills of hot food or beverages that could result in embarrassment, damage to clothing and other property, injuries, and litigation against a host, facility owner, or other involved party.

It is a still further object of the invention to provide an easy way for one person to carry food and beverages for additional people. For example, a parent or caregiver may need to carry the meals of one or more children or persons in their care in a single trip rather than multiple trips which otherwise might require a lapse in supervision and interrupted visual attention.

It is still a further object of the invention to provide a way to use container modules to allow stacking additional bays on top of a base tray so that more food can be securely carried while also keeping said foods separated from other foods on the same tray and separated from the bottom surface of upper trays.

It is a still further object of the invention to accommodate individual's different needs by allowing the container modules to be reconfigured on a tray which would better suit the needs of left-handed people, disabled people, children or other persons with special needs. The invention includes container modules that can be securely held in place on a base tray but also easily lifted out of the tray and moved to a different position or location on the base tray to make it easier and safer for those with special needs to access food and beverages.

It is a still further object of the invention to provide a way to reduce food waste by allowing users to select container modules of an appropriate size to match their desired portion rather than providing typical larger sized bowls or other containers that would encourage taking larger portions.

It is a still further object of the invention to provide a way to reduce environmental impact and costs to a host by providing container modules with a smaller ratio of disposable material to food quantity, by enabling the re-use of the base tray with different container modules, and/or by reducing the amounts of larger standard sized containers that would otherwise typically be used.

It is a still further object of the invention to provide a unique identifier on each disposable or reusable tray and container module that is packaged together, or that is packaged as a series of multiple packages, which uniquely identifies that tray or container module among all items in the package, or series of packages, so that users can easily determine if the tray or container module is his or her own rather than instead belonging to another user. The unique identifier would allow users to identify which container module belongs to the user and reduce embarrassment among users, reduce spread of germs and potential illness from using another person's tray or container module, and reduce waste of food and disposable materials that might occur if a user were unable to identify his or her tray or container module.

It is a still further object of the invention to make the unique identifiers of different trays and container modules easy to remember by providing a theme to aid memory so that a user can more easily remember which tray and container modules belong to the user.

It is a still further object of the invention to provide pictures, depictions, text or other markings in the base tray and container modules that can provide a user with educational information or visual entertainment while waiting in line for food service or at other times during use.

Further objects and advantages of this invention will become apparent from a consideration of the drawings and ensuing description wherein, for purposes of illustration only, specific forms of the invention are set forth in detail.

BRIEF DESCRIPTION OF THE DRAWINGS

These and other advantages of the present invention will be readily understood with reference to the following specification and attached drawing wherein.

REFERENCE NUMERALS IN DRAWINGS 30 and 30' Base trays including features 31-38
31 Base tray side edge
32 Base of base tray
33 and 33' Base tray dividers that form compartments
34 An individual compartment formed by dividers
38 Unique identifier on each base tray in a package or series of packages
40 Bowl module including features 41-48
41 Bowl module outer wall
42 Bowl module base
44 Bowl module compartment
48 Unique identifier on each bowl module in a package or series of packages
50 Compartmented container module including features 51-58
51 Compartmented container module outer wall
52 Compartmented container module base
53 and 53' Compartmented container module dividers that form compartments
54 An individual compartment of a compartmented container module
58 Unique identifier on each compartmented container module in a package or series of, packages
60 Platter container module including features 61-68
61 Platter container module outer wall
62 Platter container module base
64 Platter container module compartment
68 Unique identifier on each platter container module in a package or series of packages
70 Cup container module including features 71-78
71 Cup container module outer wall
72 Cup container module base
74 Cup container module compartment
77 Recessed "+" female mating surface in cup container module base
78 Unique identifier on each cup container module in a package or series of packages
80 Cup holder container module including features 81-84
81 Cup holder container module outer wall
82 Cup holder container module base
84 Cup holder container module interior
90 Stackable container module including features 91-94
91 Stackable container module outer wall
92 Stackable container module base
98 Unique identifier on stackable container module
100 Alternative embodiment of base tray with recessed squares female mating surface including features 101-104
101 Base tray side edge
103 and 103' Base tray dividers that form compartments
104 An individual compartment formed by dividers
110 Alternative embodiment of base tray with recessed circles comprising a female mating surface
120 Alternative embodiment of base tray with circles and diamonds comprising a female mating surface
130 Alternative embodiment of base tray with recessed hexagons comprising a female mating surface
140 Alternative embodiment of base tray with staggered hexagons comprising a female mating surface
150 Alternative embodiment of base tray with recessed triangles comprising a female mating surface

DETAILED DESCRIPTION

Figure 1:
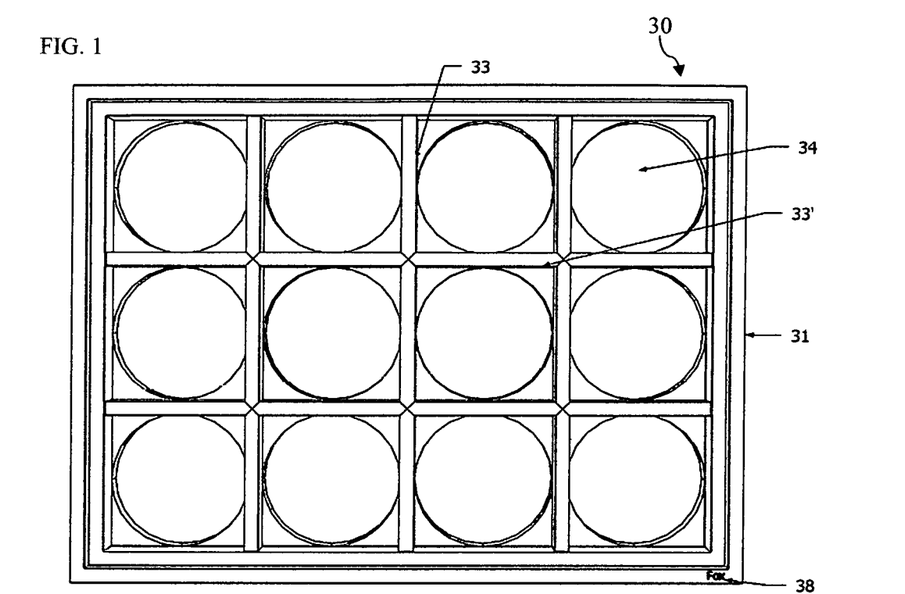
FIG. 1 is a top view of a preferred embodiment of a base tray.
Figure 2:
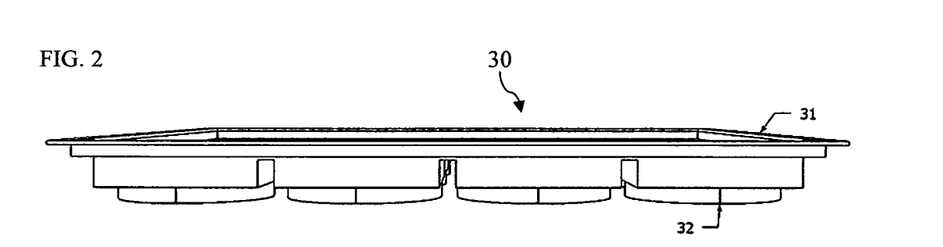
FIG. 2 is a side view of a preferred embodiment of a base tray.
Figure 3:
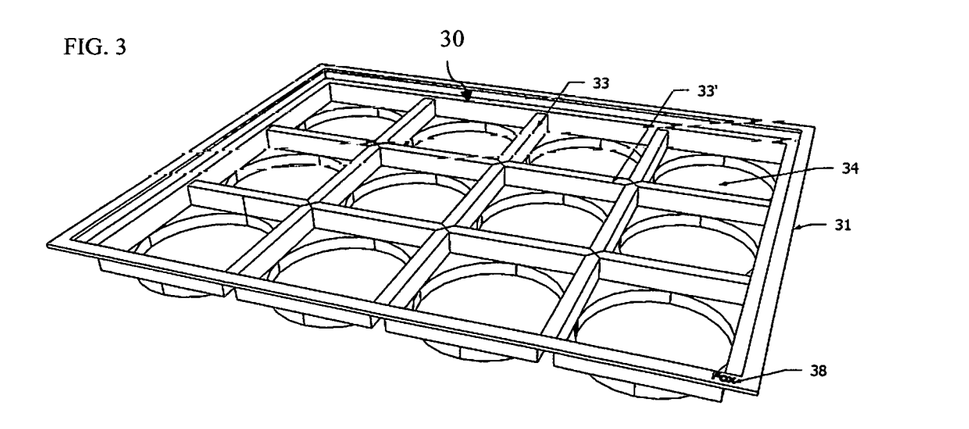
FIG. 3 is a perspective view of a preferred embodiment of a base tray.

FIG. 1 shows a top view of an exemplary embodiment of a base tray 30 that can hold food and other substances directly and securely hold different exemplary embodiments of container modules. FIG. 2 shows a side view of the exemplary embodiment of said base tray and FIG. 3 shows a perspective view of the exemplary embodiment of said base tray. The exemplary embodiment of the base tray has three rows of four compartments 34 in each row formed by three vertical dividers 33 rising from the square base of the compartments and intersecting with two perpendicular vertical dividers 33' also rising from the square base of the compartments. Within each square containment area formed by the dividers is a further recessed circular area that together with the square comprise each base tray compartment 34.

Each base tray compartment can hold a small amount of food or other substances or optionally one or more compartments together with the corresponding divider surfaces can serve as a female mating surface to securely hold, and also easily release, one or more optional container modules with examples including—but not limited to—bowl container modules, cup container modules, cup holder container modules, platter container modules, and/or compartmented container modules described herein.

The base tray and container modules are designed to be nestable with a plurality of other similar items so that they stack easily and compactly for easy shipping, transport, storage and management.

The exemplary embodiment of the base tray 30 uses square containment areas within which a further recessed circular shaped containment area together comprise a compartment 34, which compartments provide a female mating surface that can hold various container modules. Each recessed circle in the preferred embodiment is designed with a diameter and sloped sides to match the base diameter and shape of a standard size cup and thereby securely hold said cup. A cup holder module 80 has an outer diameter to fit the circular containment area of the compartments 34 and it has an inner diameter that is matched to the diameter and shape of the base of smaller standard cups. Other cup holder modules not shown would have inner diameters and shapes to fit other standard sized cups including by way of example but not limited to Styrofoam, paper, or plastic cups of typical capacities such as 12 oz, 8 oz, or other sizes.

Figure 4:
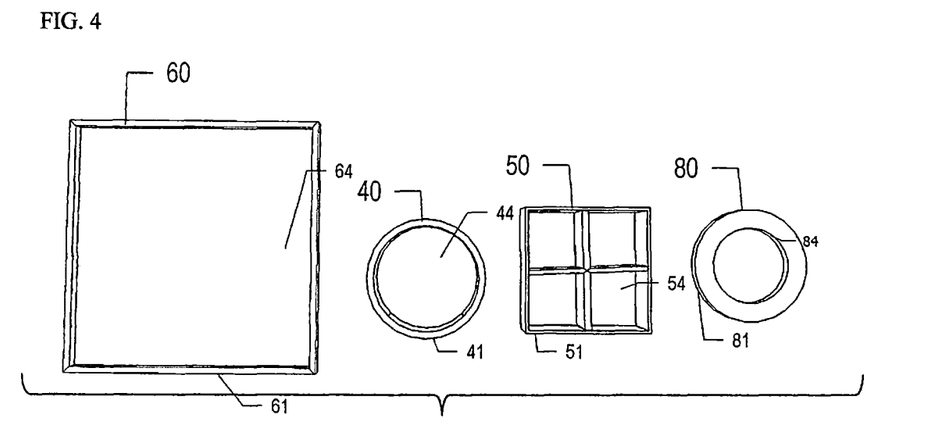
FIG. 4 is a top view of preferred embodiments of several container modules that fit to the base tray including a platter (60), bowl (40), compartmented container (50) and cup holder (80).
Figure 5:
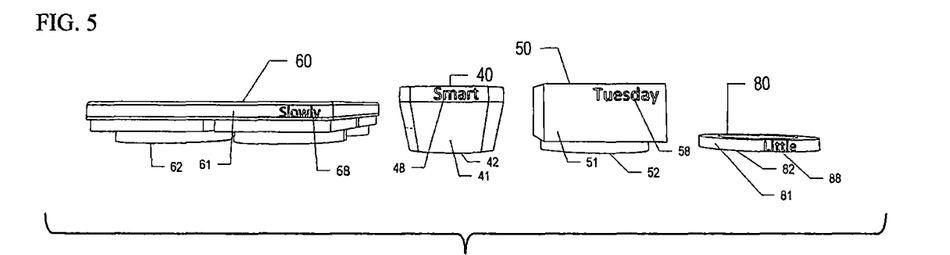
FIG. 5 is a side view of preferred embodiments of several container modules that fit to the base tray including a cup holder (80), compartmented container (50), bowl (40), and platter (60).
Figure 6:
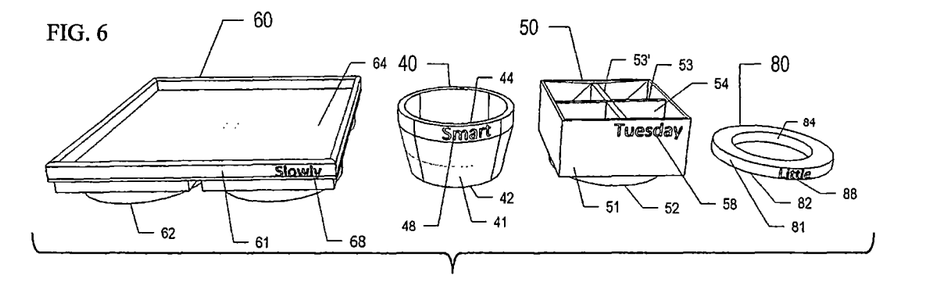
FIG. 6 is a perspective view of preferred embodiments of several container modules that fit to the base tray including a platter (60), bowl (40), compartmented container (50) and cup holder (80).
Figure 7:
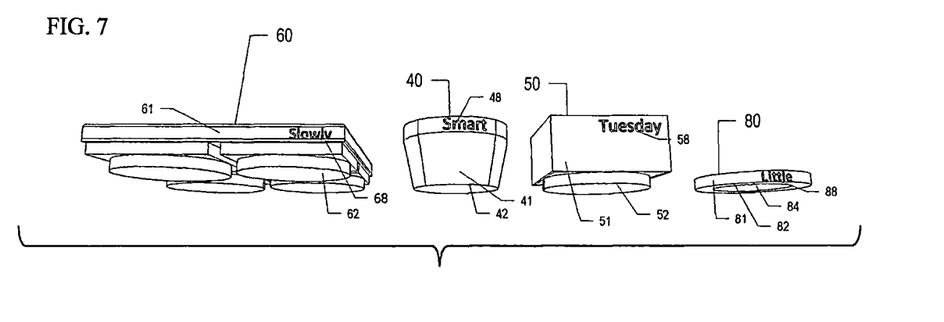
FIG. 7 is a bottom perspective view of preferred embodiments of several container modules that fit to the base tray including a cup holder (80), compartmented container (50), bowl (40), and platter (60).

FIG. 4 shows a top view, FIG. 5 shows a side view, FIG. 6 shows a perspective view and FIG. 7 shows a bottom perspective view of exemplary embodiments of container modules. Each container module has a base that fits securely and releases easily from the female mating surface of the base tray described above and depicted in FIG. 1. The exemplary embodiments of the container modules depicted in FIGS. 4, 5, 6 and 7 include a platter container module 60, a bowl container module 40, a compartmented container module 50, and a cup holder container module 80. These exemplary embodiments of container modules illustrate different sizes and shapes of container modules, differences in the bases of the container modules that provide a male mating surface and different configurations of interior dividers and resulting compartments. For example, the exemplary bowl container module provides higher walls than the compartments on the base tray to provide more room to hold non-solid foods like soups and other foods. Other container module types of various shapes, size and number of interior compartments are envisioned.

Each container module has a base surface that fits the shape of the compartments which comprise the female mating surface of the base tray 30 so that the container module can be held securely in place and can also be easily removed from the base tray by the user. Container modules such as the bowl container module 40 and cup holder module 80 each have a circular base, 42 and 82 respectively, as depicted in FIGS. 6 and 7, that each fit into a recessed circular compartment of the base tray 30. The circular base exemplified by both bowl base 42 and cup holder base 82 is a single-tier male mating surface that each fits into the recessed circular containment area within a single compartment on the female mating surface of the base tray. Although bowl container module 40 has a solid bottom in its exemplary embodiment while cup holder container module 80 has a hollow center resembling a donut hole in the bottom of its exemplary embodiment, both have a single-tier male mating surface that engages only the recessed circle of a compartment in the base tray and both each only occupy a single-unit of the base tray. The exterior outer side and bottom side of the base of both embodiments provide a sufficient surface to hold each respective container module securely in the recessed circular containment area of the female mating surface of the base tray and are also easily removed by the user.

Container modules such as the exemplary compartmented container module 50 depicted in FIGS. 4, 5, 6 and 7 have a circular base with a square shaped secondary base above the circular base which together comprise a two-tier male mating surface which is designed to fit into a single compartment 34 on the base tray female mating surface. When a container module with a two-tier mating surface, such as said compartmented container module, is placed in the compartment of a base tray, the square outside surface of the container module's two tier mating surface makes contact with the square containment area of a base tray compartment and the circular outside surface of the container module's two tier mating surface makes contact with the recessed circular containment area of the base tray compartment, so that the base tray compartment holds the container module with increased stability due to the surface area contact of the two tiers of the two tier mating surface. The exemplary embodiment of the compartmented container module 50 depicts subdivisions within the container module having a vertical divider 53 and perpendicular vertical divider 53' which divide the compartmented container into four compartments. The four compartments would provide space for a user to add foods or other substances including non-solid foods used in small quantities such as sauces, dips, or other foods. Compartmented container modules with other numbers of dividers and compartments are envisioned.

Container modules such as the exemplary platter container module 60 have a base consisting of multiple two-tier male mating surface units. The exemplary platter container module 60 has four two-tier male mating surface units as depicted in FIG. 7. Each of the four two-tier male mating surfaces fits snugly into a single compartment 34 on a base tray female mating surface. The exemplary embodiment of the platter container module shows a single compartment on its top surface with no subdivisions which single compartment enables users to easily add larger foods such as salads, beef ribs, chicken legs, a serving of pasta or other foods or substances without the interference that dividers would cause. Other type of container modules with various shapes, sizes, number of interior compartments and number of mating surface units are envisioned.

Figure 8:
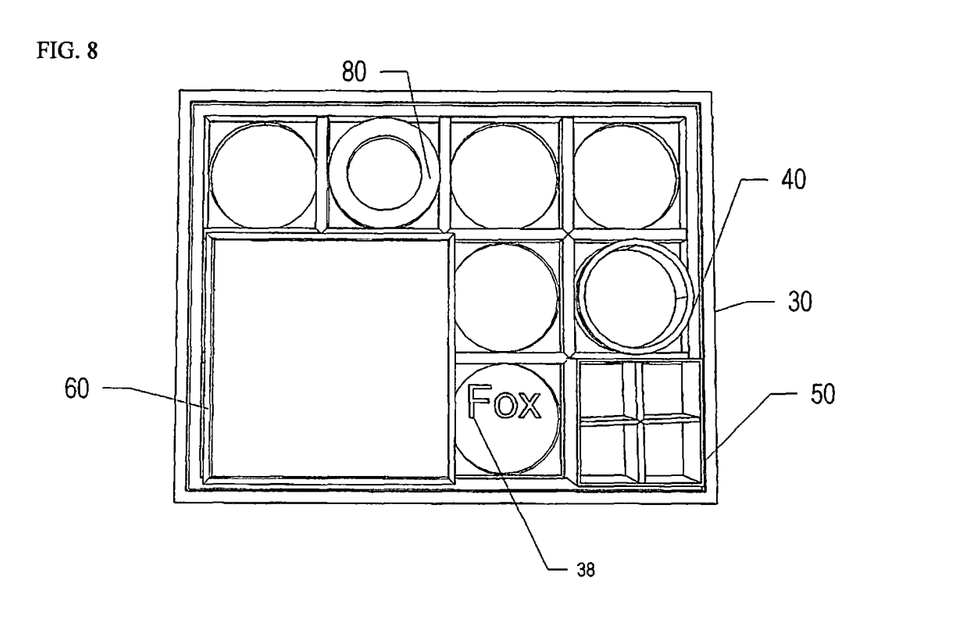
FIG. 8 is a top view of a base tray fitted with several exemplary container modules including a cup holder (80), platter (60), bowl (40), and compartmented container (50).
Figure 9:
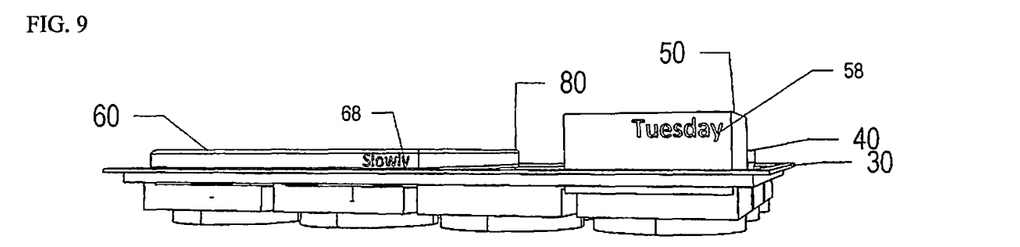
FIG. 9 is a side view of a base tray fitted with several exemplary container modules.
Figure 10:
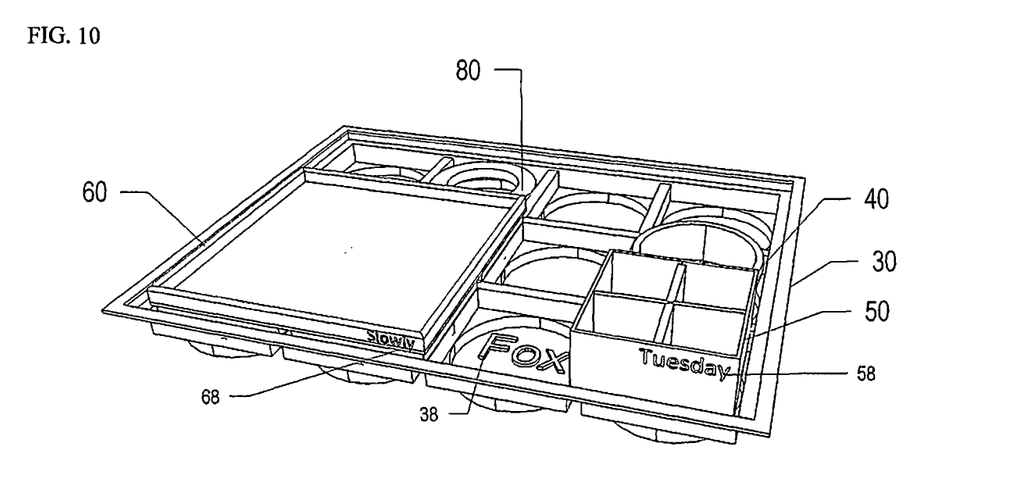
FIG. 10 is a perspective view of a base tray fitted with several exemplary container modules including a platter (60), cup holder (80), compartmented container (50) and bowl (40).

FIG. 8 provides a top view of a base tray 30 fitted with four exemplary container modules including a cup holder container module 80, platter container module 60, bowl container module 40, and compartmented container module 50. FIG. 9 provides a side view and FIG. 10 provides a perspective view of the base tray and container modules depicted in FIG. 8. FIGS. 8-10 depict how exemplary embodiments of a cup holder container module 80 and a bowl container module 40, which each have single-unit, single-tier mating surfaces, each fit into a single compartment 34 of the female mating surface of the base tray 30. FIGS. 8-10 each also show how the exemplary embodiment of a compartmented container module 50, which has a single-unit, two-tier mating surface, fits into a single compartment 34 of the female mating surface of the base tray 30. FIGS. 8-10 each also show how the exemplary embodiment of a platter container module 60, which has four two-tier mating surface units, fits into four compartments of the female mating surface of the base tray 30. Other container modules with various shapes, sizes, number of interior compartments and number of mating surface units are envisioned.

Figure 16:
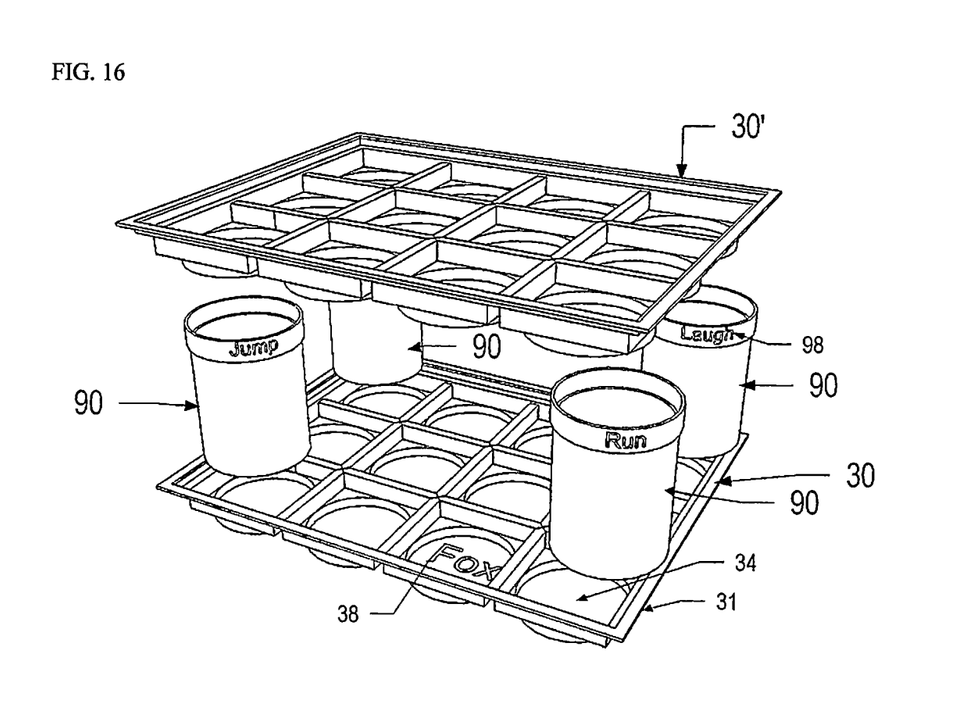
FIG. 16 is a perspective view of two base trays with four container modules allowing stacking of the base trays shown as an exploded view.
Figure 17:
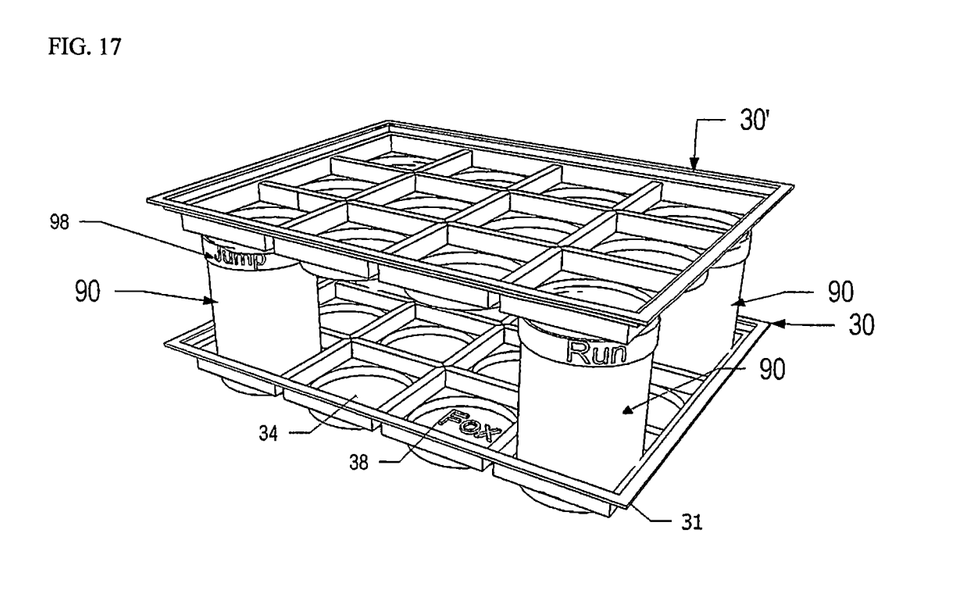
FIG. 17 is a perspective view of two base trays with four container modules allowing stacking of the base trays shown fitted together in a stacked configuration.

FIG. 16 provides a perspective view of two base trays and four stacking container modules which said stacking container modules can function as cups, bowls or other containers and which container modules fit securely into compartments 34 of a base tray 30 and which have an opening on the top of the container module that fits and securely holds the base of a compartment of a second base tray 30'. The use of a plurality of said stacking container modules enables stacking multiple base trays separated at a vertical distance so that food placed on a lower stacked tray does not contact the bottom of an upper stacked tray. FIG. 17 provides a perspective view of two base trays and four stacking container modules in an assembled configuration so that the top base tray is held by the stacking container modules securely to the bottom base tray.

The preferred embodiment of the invention includes a unique identifier that provides a way for the user to remember which base tray and container modules belong to said user to prevent accidentally using another person's tray or container module and prevent another user from using said users tray or container module. The unique identifier uniquely distinguishes each base tray in a package from other base trays in the package or series of packages, and each container module within a package from other similar container modules in the package or series of packages. The exemplary embodiment of a unique identifier is a word or words, image or images, or any combination of word, words, image or images that are unique to the base tray and/or container module among all base trays and/or container modules within a package or series of packages. FIG. 3 shows an exemplary unique identifier 38 on an exemplary base tray 30. FIGS. 5 and 7 show an exemplary unique identifier 58 on an exemplary compartmentalized container module 50, an exemplary unique identifier 48 on an exemplary bowl module 40 and an exemplary unique identifier 68 on an exemplary platter module 60. FIGS. 9 and 10 depict exemplary unique identifiers on a base tray 30 and container modules 50 and 60 and with the container modules fitted into the base tray.

The unique identifiers can be themed including, but in no way limited to, examples such as using a different animal word or image or combination of words and images on each container in a package or series of packages such as panda, bear, dog, cat, and other similar words or images or combinations of words and images. Unique identifier themes could include pictures, texture variations, designs, letters, numbers, or any other distinct visual and/or tactile marking. Textures could be used to provide unique identifiers that are useable by blind persons or in conditions where visibility is reduced.

The preferred embodiment of the invention would have themes for the unique identifier so that it is easier for a user to remember a unique identifier for each tray and each container used by the user. For example, the unique identifier for each tray could be a type of animal, the identifier for each cup could be a verb, the identifier for each bowl could be an adjective, the identifier for each platter could be an adverb, the identifier for each compartmented container could be when something happened. For example, a user with two bowls with identifiers "green" and "smart", a tray with identifier "fox", a cup with identifier "leaped", a platter with identifier "slowly" and a compartmented container with identifier "Tuesday" could combine the unique identifiers into a sentence like "green"+"smart"+"fox"+"leaped"+"slowly"+"Tuesday" to make it easy to remember all of the container identifiers.

The preferred embodiment of the tray and modules also would have unique depictions and text in one or more compartments which provide educational information or visual entertainment which is not depicted in the drawings. For example, each compartment of a given tray or module could have a different image and text describing an herb and its name. Other examples include, but are not limited to, images, text or combinations of images and text of different animals, states, countries or geographic areas, historical people, historical events, poems, famous sayings, celebrities, interesting facts and depictions of a particular or different holidays, types of vehicles, inventions, plants, sports, architectures, art works, depictions of and recipes for foods or alcoholic beverages, musical instruments, steps in a process such as making a cake, textures such as braille letters, or various other themes. The depictions and text may use any combination of black and white, color, glow-in-the-dark, or fluorescent inks or other materials, may be two-dimensional, two-dimensional appearing to be three-dimensional, or three dimensional, and may include scents such as those released by user contact or temperature. The exemplary embodiment includes trays and modules that are packaged according to a theme that is supported by depictions and text in the compartments.

The preferred embodiment of the tray and container modules use materials that are reusable or disposable. The preferred embodiment of the tray and container modules made from disposable materials would be materials that are biodegradable, recyclable or repulpable. However, the tray and container modules can be made of a variety of materials including but not limited to paper, cardboard, molded pulp, plastics such as melamine, PS, PP, polylactic acid and other plastics, bamboo, sugarcane straw and other suitable food-safe materials or combinations of materials. An alternative embodiment includes a waterproof or water-resistant coating on the surface of the tray and container modules that contacts foods to increase durability. The tray and container modules can be manufactured and formed using any of a variety of techniques known to someone skilled in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Additional Embodiments

An additional embodiment of a container module would have a top surface with multiple compartments that can hold food or other substances and which also form a mating surface where additional container modules can be securely placed. An example of the additional embodiment is a container module with multiple mating surface units like the mating surface of a platter container module but with a top surface that is comprised of dividers and compartments which also can be used as a mating surface to hold other container modules.

Additional container module components could include lids or top surfaces that easily support stacking of additional container modules providing users with a way to vertically stack container modules and therefore carry more food and/or beverages securely while keeping the food items separate and that can easily be un-stacked for use and consumption of food placed in the container modules.

Alternative Embodiments

Other embodiments of container modules are envisioned that would include various combinations of size, dimensions, outer wall heights, dividers and compartments, and male mating surfaces. Various combinations of container module characteristics can be combined to form other embodiments of container modules beyond those specifically depicted herein.

Other embodiments of bowl container modules could have a single interior compartment or any number of interior compartments formed by interior dividers of any height or shape. Other embodiments could also alter the height of the outer walls, or shape of the outer walls above the contact area of the single-tier mating surface, or other dimensions to be more suitable for other uses.

Other embodiments of container modules with a single-unit, two-tier mating surface could have a single interior compartment or any number of interior compartments formed by interior dividers of any quantity, height, or shape. Other embodiments could also alter the height of the outer walls, or shape of the outer walls above the contact area of the two-tier mating surface, or other dimensions to be more suitable for other uses.

Other container module embodiments may have length and width dimensions that like the platter container module 60 similarly have multiple base units and are larger than a single compartment on the base tray female mating surface and could include any number of male mating surface units corresponding to the size and shape of the container module. For example, an alternate module could have a shape that corresponds to two compartments in the base tray female mating surface and have two two-tier male mating surfaces. Other embodiments could also include internal dividers of various shapes and sizes to form any number of compartments. Other embodiments could also alter the height of the outer walls, the shape of the outer walls above the contact surface of the two-tier male mating surface, or other dimensions to be more suitable for other uses.

Figure 11:
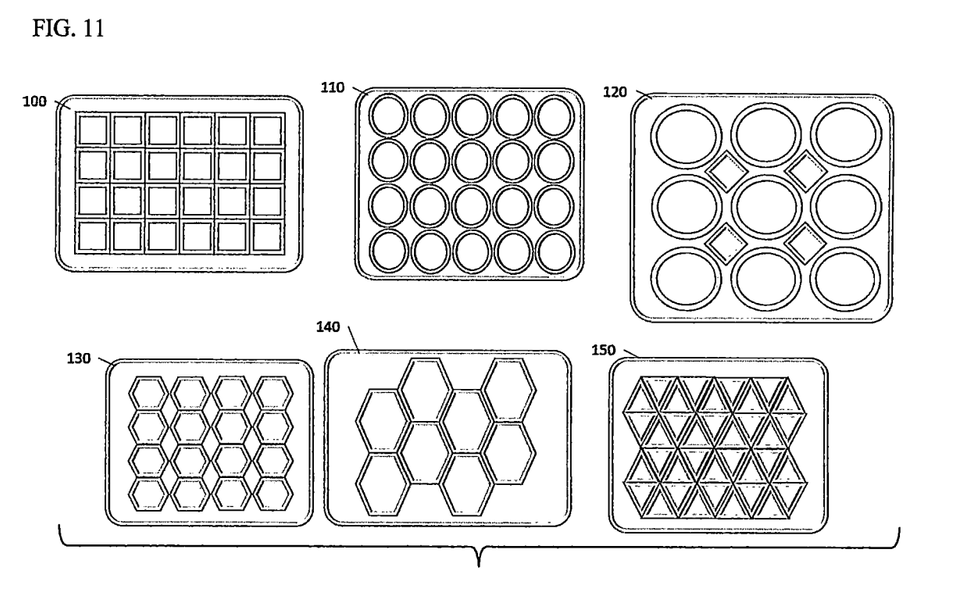
FIG. 11 is a top view of several alternative embodiments of the female mating surface of a base tray.
Figure 13:
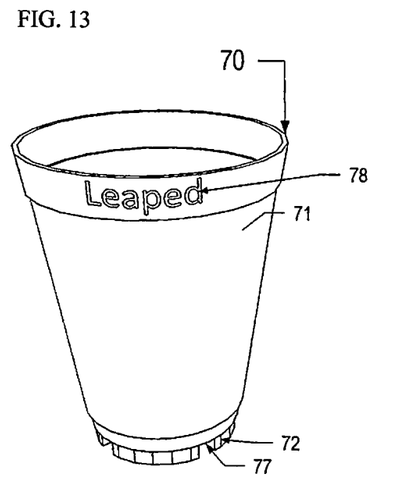
FIG. 13 is a perspective view of a beverage cup container module with a female mating surface base.
Figure 14:
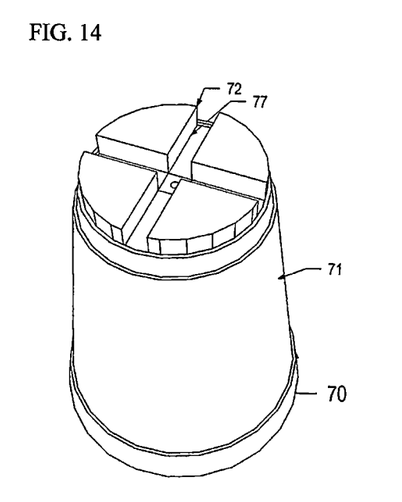
FIG. 14 is a bottom view of a beverage cup container module with a female mating surface base.
Figure 15:
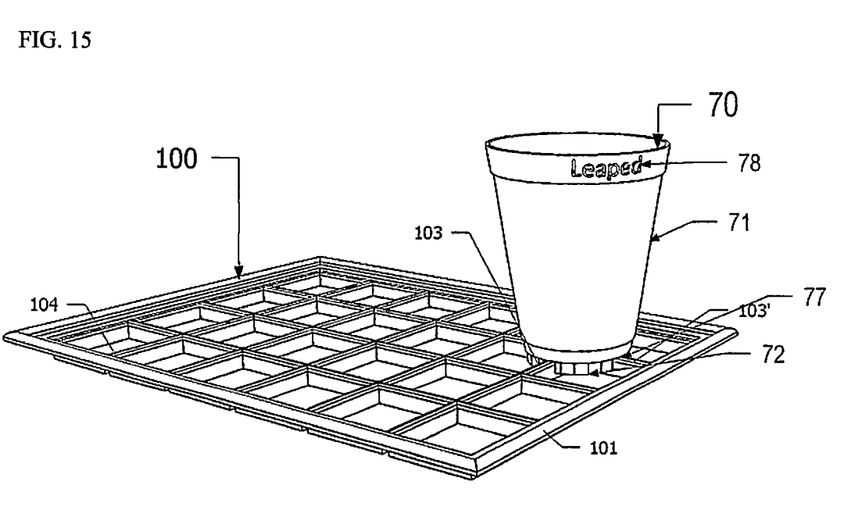
FIG. 15 is a perspective view of a beverage cup container module with a female mating surface base fitted to an alternative embodiment of a base tray.

Alternative embodiments of a base tray could have various different numbers of dividers and compartments. FIG. 11 depicts some alternative potential embodiments 100, 110, 120, 130, 140, and 150 of the base tray and base tray mating surface. Base tray mating surface 100 shows the base tray with recessed square shapes for the base tray female mating surface compartments instead of the recessed circular shapes within square shapes shown in the exemplary embodiment. The female mating surface of 100 is exemplary of a single-tier female mating surface and the male mating surface of any container modules would also be adapted to be single-tier. The female mating surface of 100 is also not designed to securely hold a standard cup. FIG. 13 provides a perspective view of an exemplary embodiment of a cup container module 70 with a grooved base that fits to the intersection of dividers on a base tray such as mating surface 100, the mating surface of base tray 30, or any other surface with intersecting dividers. FIG. 14 shows a bottom view of cup container module 70 depicting a "+" shaped recessed groove in the base 77. FIG. 15 shows a perspective view of a cup container module 70 fitted to a divider intersection on a base tray with female mating surface 100. FIGS. 13 and 14 depict an exemplary unique identifier 78 on a cup container module 70. Alternative embodiments of container modules could have various heights and shapes above the grooved contact surface and/or multiple grooved contact surfaces to fit across two or more divider intersections on a mating surface.

An alternative embodiment of a container module with "+" shaped recessed grooves in the base would have internal dividers to form multiple compartments and which a second similar module with "+" shaped recessed grooves in the base could be securely stacked on top of the intersection of the compartment dividers in the first module.

An alternative embodiment of a container module with "+" shaped recessed grooves in the base would allow said module to be stacked on the inside corners of four adjacent rectangular or square container modules so that the corners of the four adjacent container modules form a male "+" shaped mating surface.

Other embodiments of base tray mating surface patterns are depicted in FIG. 11. Mating surface 120 shows an embodiment of the base tray with recessed circle shaped compartments for the mating surface that each are large enough to hold a typical cup produced by third parties interspersed with recessed diamond shaped compartments. Mating surface 110 shows an embodiment with single-tier recessed circular compartments. Mating surface 130 shows the base tray with recessed hexagon shaped compartments. Mating surface 140 shows the base tray with recessed hexagon shaped compartments staggered to fit closely together for the mating surface. Mating surface 150 uses alternating triangle shaped compartments for the mating surface. Additional geometric shapes are envisioned and not shown which would perform a similar function of providing recessed compartments that can hold food items and securely hold container compartment modules. Other embodiments of male mating surfaces of container modules would be adapted to fit the female mating surface patterns of base tray embodiments.

Figure 12:
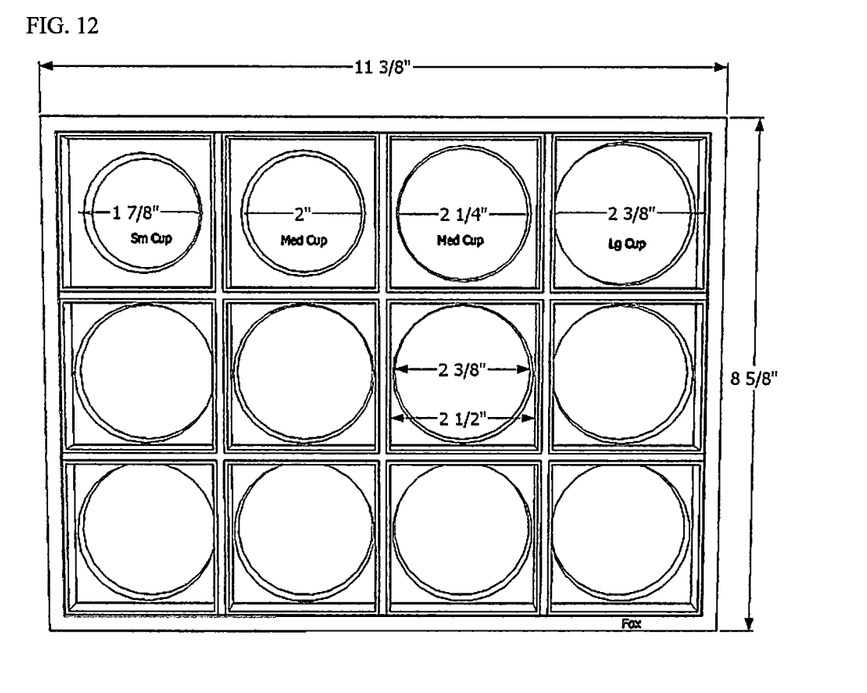
FIG. 12 is a top view of a female mating surface of a base tray with compartments of different sizes.

An alternative embodiment of a base tray could use recessed compartments of different diameters to fit different standard sized cup bases to hold said cups securely as depicted with one such example of different diameters in FIG. 12.

An alternative embodiment could mix disposable and reusable containers with disposable or reusable trays to accommodate different uses and situations. An alternative embodiment could combine a reusable tray with disposable containers. An alternative embodiment could combine reusable containers with disposable tray.

An alternative embodiment could include tabs or compressible protrusions in recessed areas that compress when a container is pushed into the recessed area to hold the container more tightly.

Additional embodiments of a unique identifier include, but are not limited to, any distinct texture or printed mark such as any combination of words, images, letters, numbers, colors, designs, pictures, bumps, and/or texture variations. The unique identifier may also be printed using glow-in-the-dark materials.

Operation

The base tray can be configured with any number of any container modules as preferred by any user to the extent that the configuration of the male mating units of the preferred embodiment of container modules are matched to the configuration of the compartments in the female mating surface of the preferred embodiment of the base tray. Examples of potential user configurations of container modules to illustrate the versatility of the base tray and modular container assembly compared to prior art include, but are in no way limited to, using the exemplary base tray to hold 12 cup holder container modules and cups; 12 standard size cups without cup holder container modules; two platter container modules, two bowl container modules, a compartmented single-unit container module, a cup holder container module, and a cup; eight bowl container modules, and two cups; a platter container module, four bowl container modules, a cup holder container module, a large cup, and a small cup; or any other configuration as limited only by the size and layout of the embodiment of the base tray.

Using four stacking container modules in the corners of a base tray enable stacking a second tray above the base tray increasing the base tray mating surface units and potential configurations of container modules used. Additional stacking container modules could be used to stack additional trays so that the configuration possibilities are significantly increased.

CONCLUSION, RAMIFICATIONS AND SCOPE

Thus the reader will see that the base tray and container modules of the invention provide unique benefits including letting different types of users in a wide variety of situations adapt the food containers they use each time to their unique needs; reduce spills, risk of damage and injury, embarrassment, materials cost, and environmental impact; and providing a unique identifier that reduces waste, confusion of ownership, embarrassment, and exposure to another person's germs.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Accordingly, the scope of the invention should be determined not by the embodiments illustrated, but by the appended claims and their legal equivalents.

The invention claimed is:

1. A modular container system comprising: at least one base tray with a plurality of round recessed areas separated by rectangular vertical divider walls, wherein said recessed areas provide a female mating surface; and a plurality of container modules that are configured to be held securely in said recessed areas, the container modules including at least one cup module to contain liquids comprising a single round base that is configured to be held in one of said recessed areas, at least one bowl module to contain viscous foods like soups comprising a single round base that is configured to be held in a single one of said recessed areas, at least one partitioned module to contain and separate a plurality of foods and condiments comprising a single round base that is configured to be held in a single one of said recessed areas, and at least one multi-unit platter comprising a plurality of round bases that fit into an equal number of said recessed areas, and with said base tray able to both hold a plurality of said container modules in various combinations and hold and separate food items directly in any of said recessed areas.

2. The modular container system of claim 1, wherein the multi-unit platter further comprises a flat top surface and peripheral vertical edges and with four of said round bases that are configured to fit securely into four of said recessed areas of said base tray and thereby converts said four of said recessed areas in said base tray into a single larger undivided area of food containment to adapt said base tray to easily hold larger food items.

3. The modular container system of claim 1, with the multi-unit platter further comprising a flat top surface and peripheral vertical edges and with two of said round bases that are configured to fit securely into two of said recessed areas of said base tray and thereby converts said two of said recessed areas in said base tray into a single larger undivided area of food containment to adapt said base tray to easily hold larger food items.

4. The modular container system of claim 1, further comprising four of said cup modules of equal height and four of said bowl modules of equal height, wherein when said base tray is fitted with either said four said cup modules of equal height or said four bowl modules of equal height in four corners of said base tray, thereby configured to securely support placement of a second said base tray on top of said cup modules or said bowl modules with a bottom surface of four corner recessed areas of said second base tray fitted inside openings of tops of said cup modules or said bowl modules.

5. The modular container system of claim 1, further comprising a ring-shaped adapter module configured to fit securely into one of said recessed areas of said base tray and thereby converts said one of said recessed areas to securely hold a single common sized beverage container in a hollow inner ring of said ring-shaped adapter module.

6. The modular container system of claim 1, further comprising a plurality of said base trays, and an identification system that reduces the effort for a person who is a user of said modular container system to identify and remember which said base tray and said container modules belong to said user by differentiating each similar said base tray in a package of said base trays and each said container module in a package of container modules with a different pre-printed word in accordance with a plurality of word themes, and with different types of said container modules using different said word themes that are configured to be related together.

7. The modular container system of claim 6, further comprising the identification system having the pre-printed word of each said base tray having a unique pre-printed part of speech configured to be a noun that is a name of an animal, the pre-printed word of each said cup module being a different part of speech configured to be a unique pre-printed verb, the pre-printed word of each said bowl module having a different part of speech configured to be a unique pre-printed adjective, and the pre-printed word of each said platter module having a different part of speech configured to be a unique pre-printed adverb, so that said user can simply remember a sentence fragment comprised of said word themes of each said base tray and said container module that said user is using.

8. The modular container system of claim 1, wherein said round bases of said container modules each have a recessed plus shaped indentation to form a plus shaped female mating surface that is configured to fit securely onto one intersection of said vertical divider walls of said base tray.

9. The modular container system of claim 8, wherein the container modules with recessed plus shaped indentations having said plus shaped female mating surface configured to fit securely onto plus shaped protrusions formed by adjacent corners of side walls of some of said container modules.

10. The modular container system of claim 8, wherein the partitioned module includes plus shaped interior walls forming four compartments and with intersections of interior walls forming a male mating surface upon which other ones of the container modules with recessed plus shaped indentations are configured to be stacked.

* * * * *